United States Patent
Peng et al.

(10) Patent No.: US 11,378,511 B2
(45) Date of Patent: Jul. 5, 2022

(54) METHODS AND APPARATUS FOR DETECTING CORROSION OF CONDUCTIVE OBJECTS

(71) Applicant: APPLIED MATERIALS, INC., Santa Clara, CA (US)

(72) Inventors: Gang Grant Peng, Fremont, CA (US); Robert Douglas Mikkola, Kalispell, MT (US); David Britz, San Jose, CA (US); Lance Scudder, Sunnyvale, CA (US); David W. Groechel, Santa Clara, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 120 days.

(21) Appl. No.: 16/690,576

(22) Filed: Nov. 21, 2019

(65) Prior Publication Data

US 2021/0156789 A1 May 27, 2021

(51) Int. Cl.
*G01N 17/02* (2006.01)
*G01N 27/02* (2006.01)
(Continued)

(52) U.S. Cl.
CPC ........... *G01N 17/02* (2013.01); *G01N 17/006* (2013.01); *G01N 27/002* (2013.01); *G01N 27/02* (2013.01)

(58) Field of Classification Search
CPC ...... G01N 17/02; G01N 17/04; G01N 17/006; G01N 2203/024; G01N 27/002; G01N 27/02
(Continued)

(56) References Cited

U.S. PATENT DOCUMENTS 3,156,631 A * 11/1964 Seyl ....................... G01N 17/02
205/777
3,250,689 A * 5/1966 Seyl ....................... G01N 17/02
324/71.2
(Continued)

FOREIGN PATENT DOCUMENTS

CN 101517420 A * 8/2009 ............. G01N 17/02
CN 206459944 U * 9/2017
(Continued)

OTHER PUBLICATIONS

KR 2003-0030763 A English Translation—May 2021. (Year: 2021).*
(Continued)

*Primary Examiner* — Patrick Assouad
*Assistant Examiner* — Sean Curtis
(74) *Attorney, Agent, or Firm* — Moser Taboada

(57) ABSTRACT

A method for detecting corrosion on a conductive object includes submerging a surface of the conductive object at least partially in an aqueous solution, flowing current through the surface of the conductive object by forming a voltage differential across the surface, varying the voltage differential across the surface while monitoring the current through the surface of the conductive object, determining a total charge corresponding to a corrosion level of the surface of the conductive object based on current versus voltage levels. The corrosion level may further be utilized in selecting a cleaning process to remediate the corrosion of the surface based on the corrosion level and in applying a protective corrosion barrier to on at least part of the surface after the cleaning process.

19 Claims, 5 Drawing Sheets

(51) Int. Cl.
*G01N 27/00* (2006.01)
*G01N 17/00* (2006.01)

(58) Field of Classification Search
USPC ..... 324/219, 240, 700, 718; 73/86, 600–661
See application file for complete search history.

(56) References Cited

U.S. PATENT DOCUMENTS

| | | | | |
|---|---|---|---|---|
| 4,275,352 | A * | 6/1981 | Sudar | G01N 27/06 324/442 |
| 4,335,600 | A * | 6/1982 | Wu | G07C 3/00 73/660 |
| 4,601,810 | A | 7/1986 | Tiwari et al. | |
| 5,140,264 | A * | 8/1992 | Metala | G01N 27/904 324/227 |
| 5,519,330 | A * | 5/1996 | Yamauchi | G01N 17/02 324/71.2 |
| 5,913,243 | A * | 6/1999 | Hopeck | G01N 29/2437 73/644 |
| 7,010,982 | B2 | 3/2006 | Bergman | |
| 7,521,926 | B2 * | 4/2009 | Beck | G01N 27/9046 324/228 |
| 7,987,721 | B2 * | 8/2011 | Schulz | G01N 29/223 73/620 |
| 8,224,595 | B2 * | 7/2012 | Hefner | G01N 17/02 204/422 |
| 8,475,110 | B2 * | 7/2013 | Hefner | G01N 17/02 205/776.5 |
| 8,540,936 | B2 * | 9/2013 | Hefner | F01D 5/288 422/53 |
| 8,695,445 | B2 * | 4/2014 | Laurer | F01D 5/12 73/865.8 |
| 9,395,337 | B2 * | 7/2016 | Newman | G01N 29/14 |
| 9,804,110 | B2 * | 10/2017 | Jakielski | G01N 27/025 |
| 9,804,128 | B2 * | 10/2017 | Yamamoto | G01N 29/262 |
| 10,345,799 | B2 * | 7/2019 | Dardona | F01D 21/003 |
| 11,162,887 | B2 * | 11/2021 | Al-Abbas | G01N 17/043 |
| 2005/0274611 | A1 * | 12/2005 | Schlichting | G01N 17/02 204/404 |
| 2006/0001420 | A1 * | 1/2006 | Beck | F01D 5/005 324/240 |
| 2010/0288052 | A1 * | 11/2010 | Tanaka | G01M 15/14 73/660 |
| 2011/0027063 | A1 * | 2/2011 | Hefner | G01N 17/02 415/118 |
| 2011/0210725 | A1 * | 9/2011 | Smith | G01M 15/14 324/240 |
| 2012/0285226 | A1 * | 11/2012 | Laurer | F01D 25/00 415/118 |
| 2013/0089463 | A1 * | 4/2013 | Hefner | G01N 17/043 422/53 |
| 2014/0260634 | A1 * | 9/2014 | Newman | G01N 29/22 73/645 |
| 2015/0000405 | A1 * | 1/2015 | Singh | G01B 15/02 73/627 |
| 2015/0153310 | A1 * | 6/2015 | Yamamoto | G01N 29/262 73/627 |
| 2017/0284971 | A1 | 10/2017 | Hall | |
| 2020/0191121 | A1 * | 6/2020 | Lee | F03D 17/00 |
| 2020/0292441 | A1 * | 9/2020 | Gattu | G01N 17/006 |
| 2021/0156789 | A1 * | 5/2021 | Peng | G01N 27/002 |
| 2021/0325295 | A1 * | 10/2021 | Asada | G01N 17/02 |
| 2021/0340679 | A1 * | 11/2021 | Glass | F28F 19/004 |

FOREIGN PATENT DOCUMENTS

| | | | | |
|---|---|---|---|---|
| EP | 0070124 A2 * | 1/1983 | | G01N 17/02 |
| EP | 0591802 A2 * | 4/1994 | | G01N 17/02 |
| JP | 2000328273 A * | 11/2000 | | C23F 13/005 |
| JP | 2009-042111 A | 2/2009 | | |
| KR | 10-2003-0030763 A | 4/2003 | | |
| KR | 2003-0030763 A * | 4/2003 | | G01N 17/006 |
| KR | 20030030763 A * | 4/2003 | | G01N 17/006 |
| WO | WO 00-70124 A1 | 11/2000 | | |
| WO | WO-0070124 A1 * | 11/2000 | | C23F 13/005 |
| WO | WO-2019143176 A1 * | 7/2019 | | G01M 3/045 |
| WO | WO-2021101652 A1 * | 5/2021 | | G01N 17/006 |

OTHER PUBLICATIONS

KR 2003-0030763 A—English Translation—2021. (Year: 2021).*
CN 206459944 U—English Translation—2021. (Year: 2021).*
International Search Report PCT/US2020/056774 dated Dec. 17, 2020.

* cited by examiner

METHODS AND APPARATUS FOR DETECTING CORROSION OF CONDUCTIVE OBJECTS

FIELD

Embodiments of the present principles generally relate to detection, cleaning, and treatment processes for internal corrosion of hollow objects.

BACKGROUND

Jet engines found in aircraft typically utilize multiple turbine systems. Each turbine is comprised of many turbine blades attached to a rotor. The turbine blades have complex geometries with one side being concave while the other side is convex. Due to the heavy stress environment in which the turbines are used, the turbine blades are made with a hollow center. The hollow center cannot be sealed because the turbine blades are exposed to varying pressures and, thus, require a vent or pressure relief port to allow the internal pressure of the turbine blade to equalize with the external pressure. The pressure relief port, while a necessity, also allows the internal surfaces of the turbine blade to be exposed to the external environment. The turbine blades are generally coated with a protective layer inside and out to afford some protection against the harsh environments in which the jet engines operate. However, after a certain number of flights, the turbine blades still need to be inspected as the harsh environment may cause cracking or corrosion of the turbine blades. An "on wing" inspection is performed when the jet engine is still installed on the aircraft and includes a visual inspection of the turbine blades using a borescope. At certain flight intervals, the jet engine is removed from the aircraft and an "off wing" inspection is performed. During the off wing inspection, test equipment such as a magnetoscope may be used to determine the integrity of the core material of the turbine blade for such issues as cracks, etc.

The inventors have found, however, that the magnetoscope does not 'see' the protective coating on the turbine blades and, therefore, cannot determine if corrosion is present. Thus, the inventors have provided improved methods to determine the presence of corrosion, even on interior surfaces of a hollow objects.

SUMMARY

Methods and apparatus for detecting and treating corrosion on external and internal surfaces of a hollow object are provided herein.

In some embodiments, a method of detecting corrosion of a conductive object may comprise submerging a surface of the conductive object at least partially in an aqueous solution, flowing current through the surface of the conductive object by forming a voltage differential across the surface, altering the voltage differential across the surface while monitoring the current through the surface of the conductive object, and determining a corrosion level of the surface of the conductive object based on a total charge integrated from a current-voltage cycle.

The method may further include selecting a cleaning process to remediate corrosion on the surface based on the corrosion level, wherein the cleaning process remediates metal oxides from the surface, wherein the cleaning process remediates metal sulfides from the surface, applying a protective barrier to corrosion on at least part of the surface after the cleaning process, selecting a type of protective barrier to apply to the at least part of the surface based on the corrosion level, adjusting a rate of increasing the voltage differential based on a concentration level of the aqueous solution, wherein the surface is an internal surface of a cavity of the conductive object and a probe is inserted into the cavity using at least one non-conductive spacer to separate the probe from the internal surface of the cavity, wherein the non-conductive spacer surrounds the probe and is permeable to the aqueous solution, and/or wherein the conductive object is a turbine blade.

In some embodiments, a method of detecting internal corrosion of a hollow object may comprise connecting the hollow object as an anode to a voltage supply, inserting a probe into a cavity of the hollow object, connecting the probe as a cathode to the voltage supply, at least partially submerging the hollow object in an aqueous solution such that the aqueous solution enters the cavity, sweeping a voltage level from the voltage supply from a first level to a second level, wherein the second level is higher than the first level, measuring current flowing through the hollow object during the sweeping of the voltage level, and determining a quantitative corrosion level of an internal surface of the hollow object based on a total charge integrated from a current-voltage cycle.

The method may further include selecting a cleaning process to remediate internal surface corrosion based on the quantitative corrosion level, wherein the cleaning process remediates metal oxides and metal sulfides from the internal surface, applying a protective barrier to corrosion on at least the internal surface after the cleaning process, selecting a type of protective barrier to apply to the at least the internal surface based on the quantitative corrosion level, adjusting a rate of sweeping the voltage level based on a concentration level of the aqueous solution, applying a pulsed voltage during the voltage sweeping to reduce unwanted side reactions, applying a pulsed voltage with changing power polarity during the voltage sweeping to further reduce unwanted side reactions, and/or wherein the probe is inserted into the cavity using at least one non-conductive spacer to separate the probe from an inner surface of the cavity.

In some embodiments, a non-transitory, computer readable medium having instructions stored thereon that, when executed, cause a method for remediating corrosion on a conductive object to be performed, the method may comprise submerging a surface of the conductive object at least partially in an aqueous solution, flowing current through the surface of the conductive object by forming a voltage differential across the surface, varying the voltage differential at a constant speed or pulse or variable pulses across the surface while monitoring the current through the surface of the conductive object, determining a total charge corresponding to a corrosion level of the surface of the conductive object based on current versus voltage levels, selecting a cleaning process to remediate the corrosion on the surface based on the corrosion level, and applying a protective corrosion barrier on at least part of the surface after the cleaning process.

Other and further embodiments are disclosed below.

BRIEF DESCRIPTION OF THE DRAWINGS

Embodiments of the present principles, briefly summarized above and discussed in greater detail below, can be understood by reference to the illustrative embodiments of the principles depicted in the appended drawings. However, the appended drawings illustrate only typical embodiments of the principles and are thus not to be considered limiting of scope, for the principles may admit to other equally effective embodiments.

Figure 1:
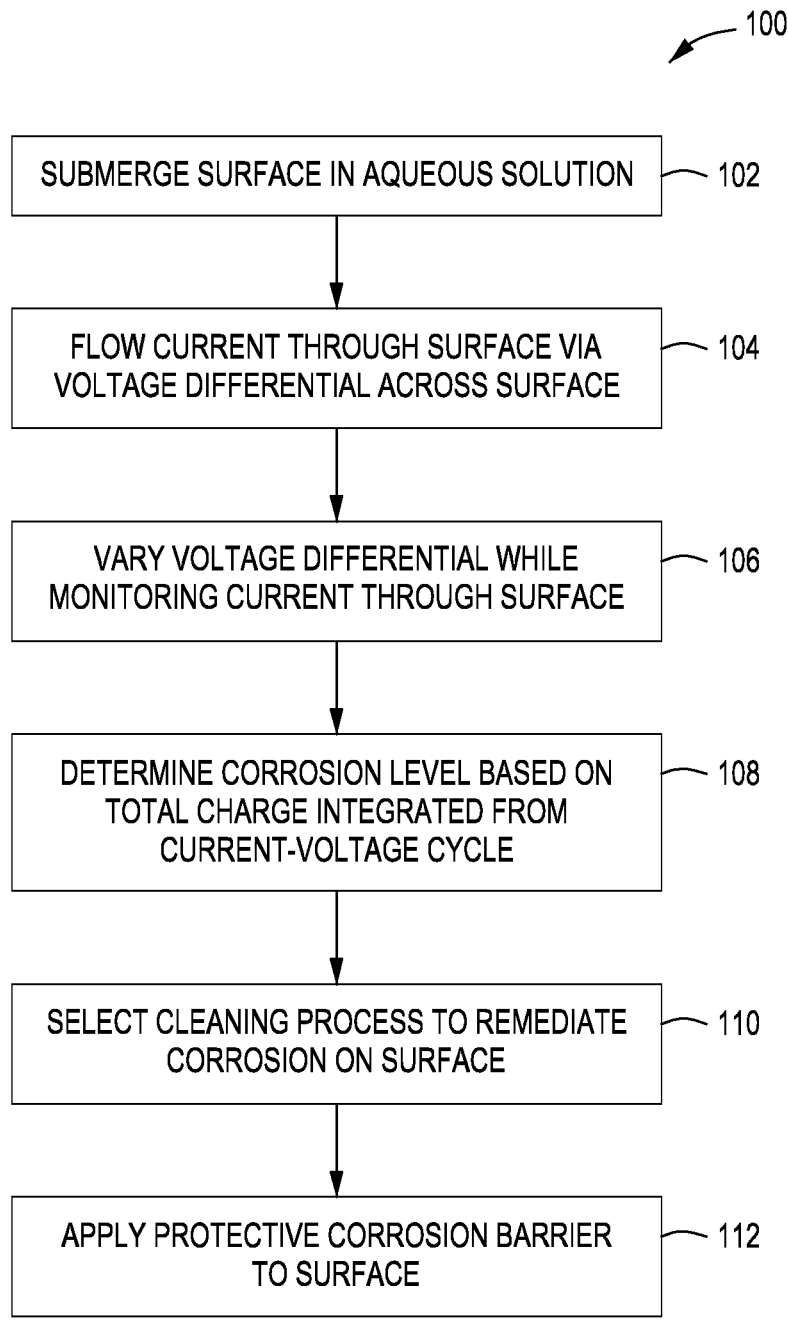
FIG. 1 is a method of detecting corrosion on surfaces of a conductive object in accordance with some embodiments of the present principles.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

An electrochemical process that is fast and scalable is used to determine quantitative levels of corrosion on inner and/or outer surfaces of hollow metallic objects. The processes provide a unique solution for precisely detecting metal corrosion on surfaces, including internal and external surfaces. The methods and apparatus herein are particularly useful for mechanical parts that have hollow sections and/or areas where corrosion occurs frequently and is difficult to visually inspect. The hollow sections may have small openings, some only a few millimeters or less in diameter, that make it a challenge to properly evaluate the internal surface conditions. Existing testing methods only provide a rough screening test with large variations of 30% or more and provide no quantitative data. Clear understanding of the internal surface corrosion condition is very important for some crucial applications, e.g., the turbine blades of a jet aircraft engine. The methods and apparatus of the present principles advantageously provide high speed corrosion measurement tests that take only minutes, 100% surface testing, quantitative results that facilitate in directing refurbishment of damaged parts, low cost, and easily scalable by a factor of 10 to 100 times for employment in high volume manufacturing processes.

When corrosion occurs on a metallic surface, the surface metal oxidation state changes and the surface electrochemical behavior changes. The inventors have discovered that the surface state and the solution changes can be used to correlate to a level of corrosion. Corrosion causes increased ions to form on the surface of the metallic surface when submerged in an aqueous solution. The increased density of ions on the metallic surface make the surface more conductive and, in turn, flows more current through the object as voltage levels across the surface are increased. If a surface is free from corrosion, the current through the object will remain constant as voltage levels are increased. The inventors have found that a quantization of an amount of corrosion can be determined from the current changes observed over an increasing sweep of voltage levels. In some hollow parts like a turbine blade found in aircraft engines, the pressure equalization vents may lead to internal corrosion of the turbine blades that can not be determined through visual inspections. If left unchecked, the internal corrosion may continue until the turbine blade fails catastrophically. Detecting the corrosion at an early stage before the core material of the turbine blade is breached, may allow the turbine blade to be cleaned and put back into service, saving a significant amount of costs associated with replacing the turbine blade. The present principles allow not only the detection of corrosion but also the level of corrosion so that a proper determination can be made as to whether a part may be safely cleaned and used or if further remediation is necessary, such as, but not limited to, recoating a surface with a protective corrosion barrier before the part is put back into service.

Figure 3:
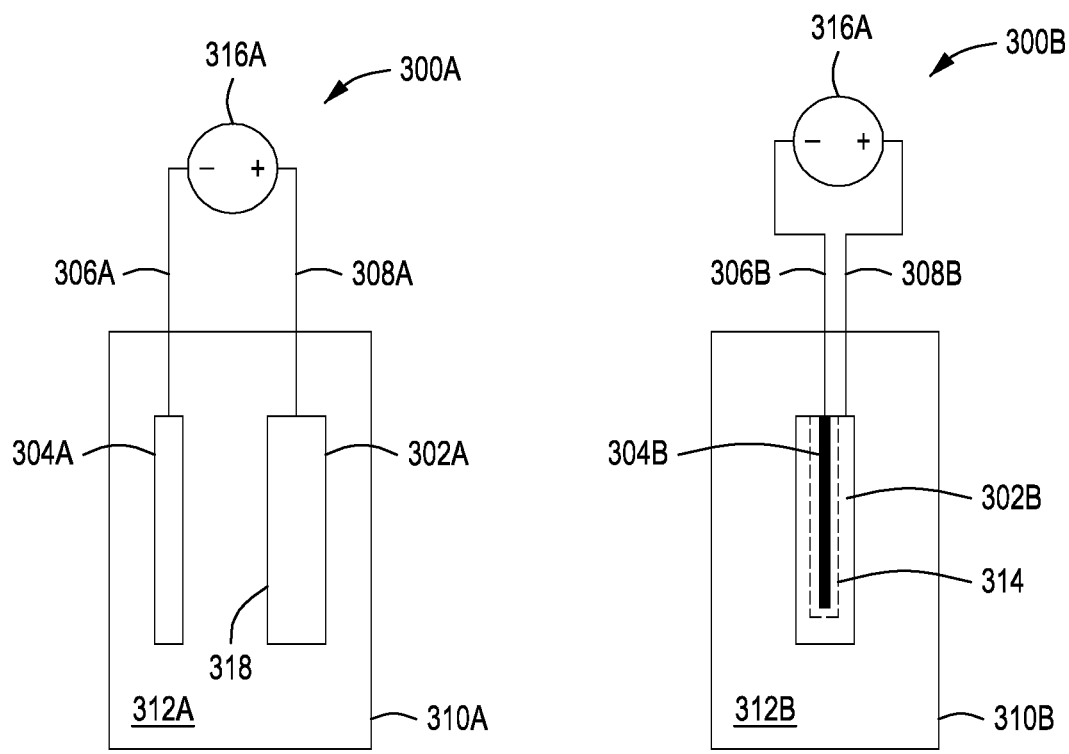
FIG. 3 depicts apparatus for corrosion detection of conductive objects in accordance with some embodiments of the present principles.

FIG. 1 is a method 100 of detecting corrosion on surfaces of a conductive object. In order to decrease a risk of contaminants affecting measurements, the surfaces of the conductive object may be optionally pre-rinsed with deionized water. The conductive object may also optionally undergo inductively coupled plasma mass spectrometry (ICP-MS) to ensure that no airborne particles are still on surfaces of the conductive object that would affect measurements. An external corrosion measurement apparatus 300A for measurement of corrosion on an external surface 318 is shown in FIG. 3. An internal corrosion measurement apparatus 300B for measurement of corrosion on an internal surface 314 is shown in FIG. 3. In block 102, a surface of the conductive object 302A, 302B is at least partially submerged in an aqueous solution 312A, 312B in a container 310A, 310B (see, e.g., FIG. 3). The surface may be an external surface 318 or an internal surface 314 of the conductive object. The external corrosion measurement apparatus 300A may include a conductive object 302A connected 308A as an electrode to a positive terminal of a DC voltage source 316A and a probe 304A connected 306A as an electrode to a negative terminal of the DC voltage source 316A. The internal corrosion measurement apparatus 300B may include a conductive object 302B connected 308B as an electrode to a positive terminal of a DC voltage source 316B and a probe 304B connected 306B as an electrode to a negative terminal of a DC voltage source 316B.

Figure 4:
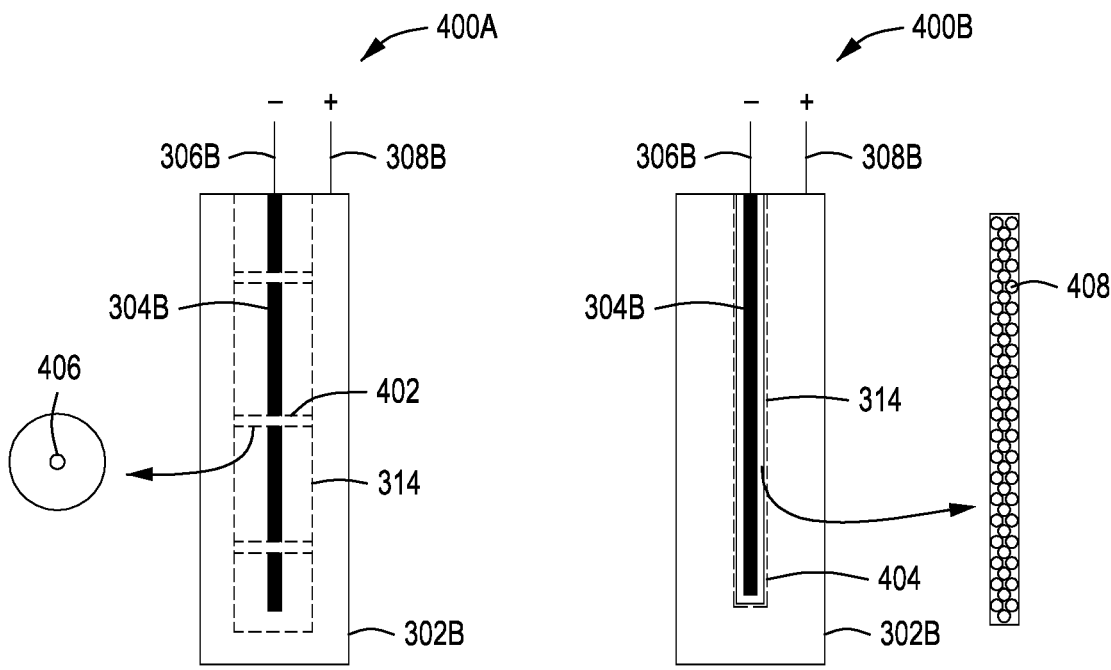
FIG. 4 depicts a cross sectional view of a probe inserted into a cavity of a hollow conductive object in accordance with some embodiments of the present principles.

The probe 304B should be maintained a distance away from the internal surface 314 to avoid shorting the probe 304B to the conductive object. A cross-sectional view 400A of FIG. 4 illustrates the probe 304B with non-conductive spacers 402 that aid in distancing the probe 304B away from the internal surface 314. In some embodiments, the non-conductive spacers 402 may be disc like shapes with a center opening 406 for the probe 304B. In some embodiments, the non-conductive spacers 402 may be semi-rigid or soft to allow the spacers to better conform to irregular internal shapes of a conductive object. In some embodiments, the non-conductive spacers 402 may be placed on the probe 304B prior to insertion into the conductive object 302B. Cross-sectional view 400B of FIG. 4 illustrates the probe 304B with a non-conductive spacer 404 that surrounds, at least partially, the probe 304B. The non-conductive spacer 404 may be made of a permeable material and/or have openings 408 to allow the aqueous solution to reach the probe 304B. In some embodiments, the non-conductive spacer 404 is applied to the probe 304B before the probe 304B is inserted inside the conductive object 302B.

The aqueous solution 312A, 312B may comprise inorganic or organic salt(s) or electrolyte(s). The aqueous solution allows the ions on surfaces of the conductive object to flow current. In block 104, current is flowed through the surface by a voltage differential applied across the surface. In block 106, the voltage differential is varied during a cycle while monitoring the current level through the surface. In some embodiments, the voltage differential for the external corrosion measurement apparatus 300A may have a range of greater than zero to approximately 1.0 volts. In some embodiments, the voltage differential for the internal corrosion measurement apparatus 300B may have a range of greater than zero to approximately 0.5 volts. In some embodiments, the voltage differential may be increased over the ranges in a linear manner. In some embodiments, the voltage differential may be pulsed or variably pulsed during a cycle. The pulsing may have a duty cycle of voltage or sweep time. In some embodiments, the pulsing may be varied by stepping/pulsing the voltage levels (up or down) or by altering the duration time of certain voltage levels. For example, a voltage level may be increased by 0.2 volts for each step/pulse and/or may be stepped down (or polarity changed). The pulsing causes modification of the surface which reduces unwanted side artifices and side reactions/effects. In some embodiments, the polarity of the voltage differential may be changed during a cycle. The polarity which can change from positive to negative or stay positive causes selective removal of certain materials or chemicals which reduces unwanted side artifices or side reactions/effects. The inventors have further found that the varying of the voltage levels and/or polarity may be utilized to regenerate the surface and/or to affect only certain materials on the surface (e.g., selective/targeted cleaning of particular types of corrosion on surfaces, etc.)

Figure 5:
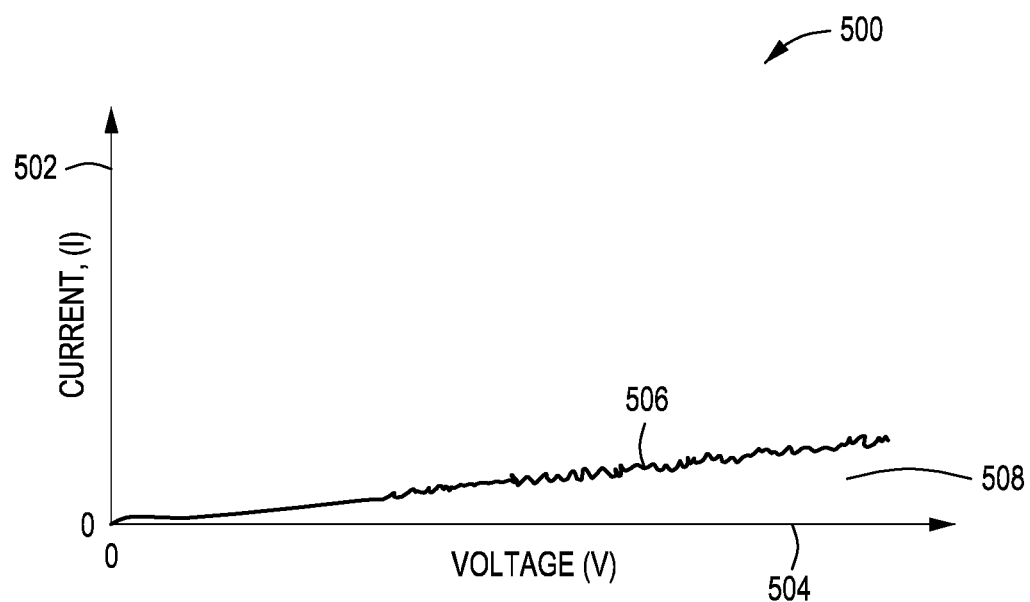
FIG. 5 depicts a graph of current versus voltage for a corroded surface in accordance with some embodiments of the present principles.

The higher the aqueous solution concentration, the faster the voltage differential may be changed. Lower concentrations require more time for the current to flow. FIG. 5 is a graph 500 with an X-axis 504 of voltage and a Y-axis 502 of current. The current vs voltage measurement 506 obtained during testing illustrates a level of corrosion on a surface of a conductive object. An area 508 under the current vs voltage measurement 506 (total charge integrated from a current-voltage cycle) represents a charge level in coulombs caused by corrosion on a surface of the conductive object. From the coulombs and the surface area, the milli-coulombs per centimeter squared ($mC/cm^2$) can be derived to quantitatively determine the surface ion concentration, which directly correlates to the surface corrosion.

The corrosion causes a 'current accumulation area' that indicates where free ions have accumulated on the surface of the conductive object. The free ions are collected during the measurement and cause an increase in current flow as the voltage is increased. If the surface of the conductive object is clean, the free ions are drastically reduced and the current increase is negligible over the range of voltages. The inventors have found that noise is present when measuring internal surfaces because of the homogeneity of the ions inside the aqueous solution, presenting challenges. The noise is reduced for external surfaces because the aqueous solution is agitated and the ions on the surface are more uniform. Agitating the aqueous solution inside small cavities of a hollow conductive object is more challenging and, thus, the ions are less uniform causing increased noise in measurements. In some embodiments, the corrosion measurements may be accomplished in a range of approximately sixty seconds to approximately five minutes. In some embodiments, both internal and external testing can be performed with a single apparatus. The present principles also permit batch testing of more than one conductive object. The batch testing may yield a generalized indicator of the presence of corrosion. If corrosion is detected in a batch, subsets of the batch and/or individual conductive objects may be tested to determine which objects have the corrosion.

Figure 6:
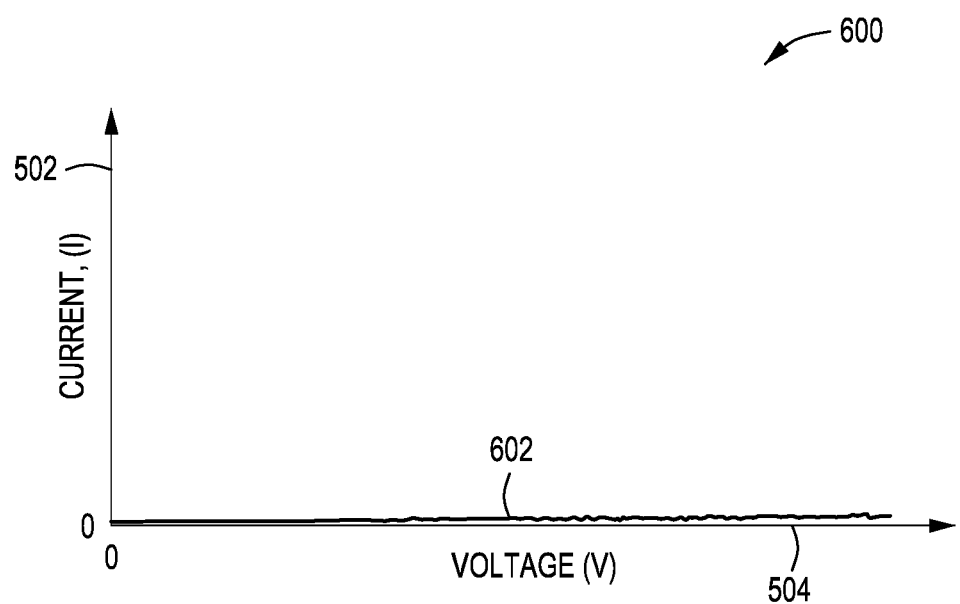
FIG. 6 depicts a graph of current versus voltage for a cleaned surface in accordance with some embodiments of the present principles.

In block 108, a determination is made as to a corrosion level on the surface based, at least partially, on the total charge integrated from the current-voltage cycle. In some embodiments, the determination may be made based upon, at least partially, the material composition of the conductive object, the type of chemistry of corrosion of the composition, and/or historical data obtained through measurements and inspection/testing of a type of conductive object. In block 110, a cleaning process to remove detected corrosion is selected based on, at least partially, the corrosion level measurements. In some embodiments, the selection of the corrosion remediation may be based, at least partially, on the material composition of the conductive object, the type of chemistry of corrosion of the composition, and/or historical data obtained through measurements and inspection/testing of a type of conductive object. FIG. 6 is a graph 600 depicting a current vs voltage measurement 602 obtained during testing after cleaning of the corroded surface shown in graph 500 of FIG. 5. The current vs voltage measurement 602 shows very little change in current level over the voltage range. The negligible current change indicates that the corrosion has been abated by the cleaning process.

Figure 7:
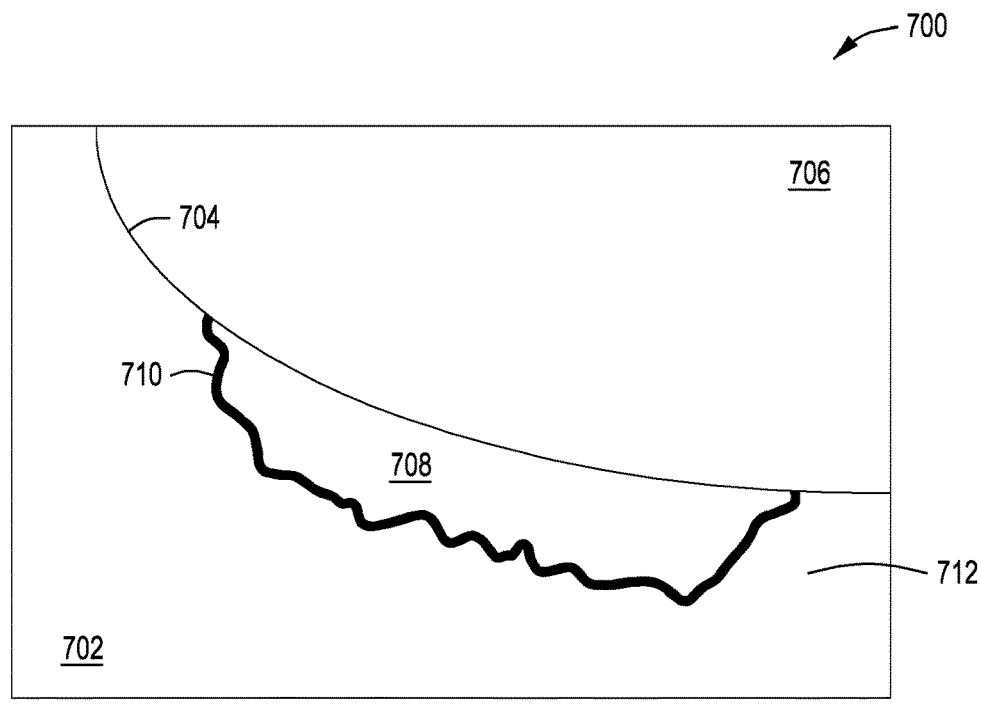
FIG. 7 is a topical view of corrosion on a surface of a conductive object in accordance with some embodiments of the present principles.

FIG. 7 shows a view 700 of a portion of a surface 702 of a conductive object with a corroded internal surface 704. An area 706 represents a hollow portion of the conductive object. A protective corrosion barrier 712 has been breached by corrosion by-products 708. The corrosion by-products may be oxides such as metal oxides of the underlying conductive material. Accelerants 710 are found at the edge of the corrosion by-products 708 and promote further corrosion. In some instances the accelerants 710 may include sulfides such as metal sulfides. In some embodiments, the cleaning process is selected based on the corrosion by-products and/or the accelerants present. The inventors have found that if the accelerants are left on the surface of the conductive object, the corrosion will continue. By removing the accelerants, future corrosion may be prevented or reduced in rate. In some embodiments, the cleaning process may utilize, for example, potassium fluoride as a cleaning solution to remediate the corrosion. Other cleaning solutions may include, but are not limited to, organic chelating reagents or hot deionized water. The inventors have found that sodium chloride may not be suitable due to sodium chloride being an aggregate of many chemical reactions which may lead to additional damage to surfaces of the conductive object and/or protective barriers of the conductive object. In some embodiments, the cleaning process may be followed by ICP-MS to verify the surface has been thoroughly cleaned and no corrosion or contamination exists.

In block 112, in some embodiments, a protective corrosion barrier may be optionally applied to the surface after cleaning. As noted above, if the corrosion is detected early, the conductive object may be returned to service after cleaning. If the corrosion level is determined to have breached a prior protective corrosion barrier, the barrier may be re-applied after cleaning.

Figure 2:
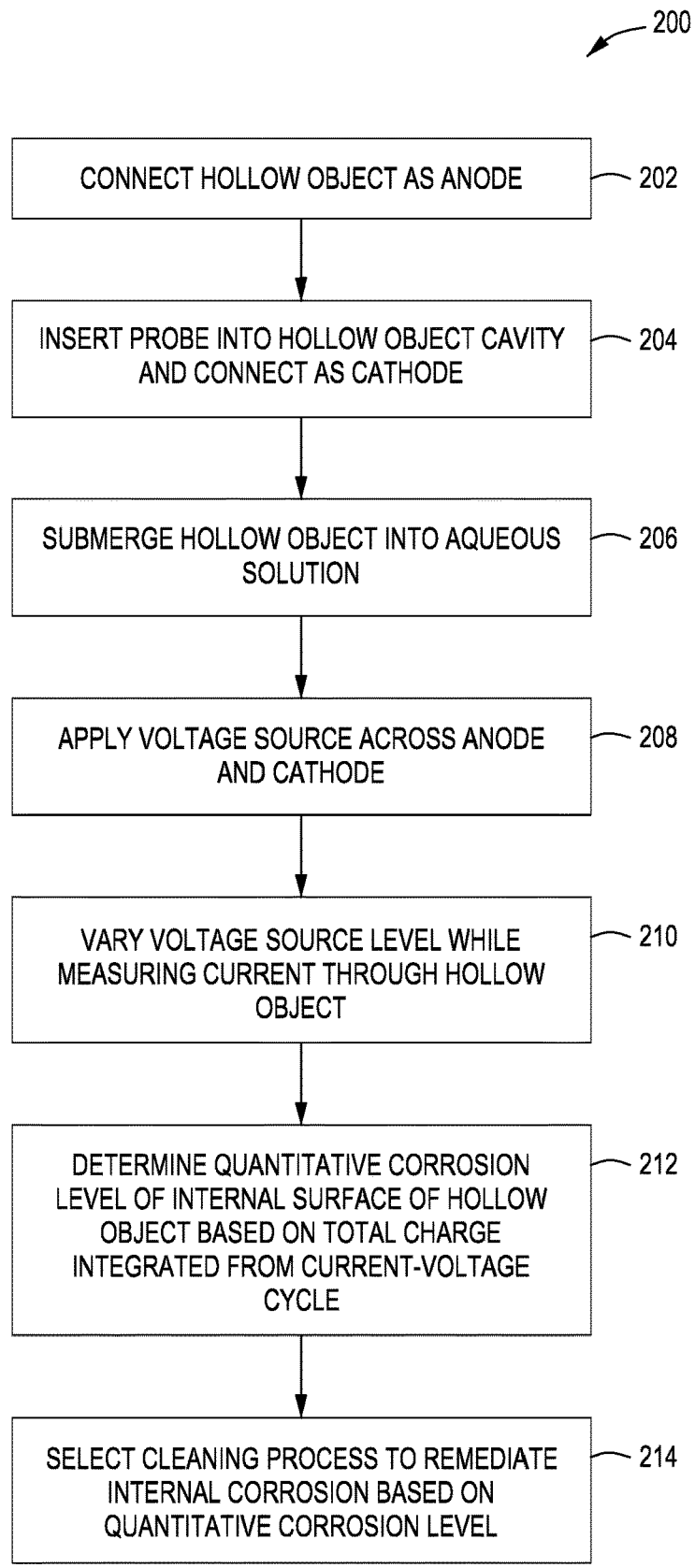
FIG. 2 is a method of detecting corrosion on internal surfaces of a conductive object in accordance with some embodiments of the present principles.

FIG. 2 illustrates a method 200 for detecting corrosion in an internal cavity of a hollow object. In block 202, the hollow object is connected to a voltage supply as an anode for an electrolytic bath. In block 204, a probe is inserted into the cavity of the hollow object and connected to the voltage supply as a cathode for the electrolytic bath. The probe may include non-conductive spacers as illustrated in FIG. 4. In block 206, the hollow object is submerged, at least partially, into an aqueous solution of the electrolytic bath. In block 208, a voltage is applied across the anode and cathode to generate current flow through a surface of the internal cavity. In block 210, the voltage is varied while measuring current flow through the surface. In some embodiments, the voltage may be increased linearly, pulsed, or variably pulsed over a given range of a current-voltage measurement cycle. In some embodiments, the polarity of the voltage may be changed in a current-voltage measurement cycle. The rate of voltage change can be increased if the concentration of the aqueous solution in the electrolytic bath is increased. In block 212, a quantitative corrosion level of the internal surface of the hollow object is determined based on a total charge integrated from a current-voltage measurement cycle. The total charge can be used to determine a coulomb charge per area for the internal surface of the hollow object. In block 214, a cleaning process is selected to remediate the internal corrosion based on the quantitative corrosion level. In some embodiments, the cleaning process may also be selected based, at least in part, on the material of the hollow object, types of corrosion by-products, types of accelerants, and/or historical data. In some embodiments, damage to the internal surface may be remediated by applying a protective corrosion barrier after cleaning.

Figure 8:
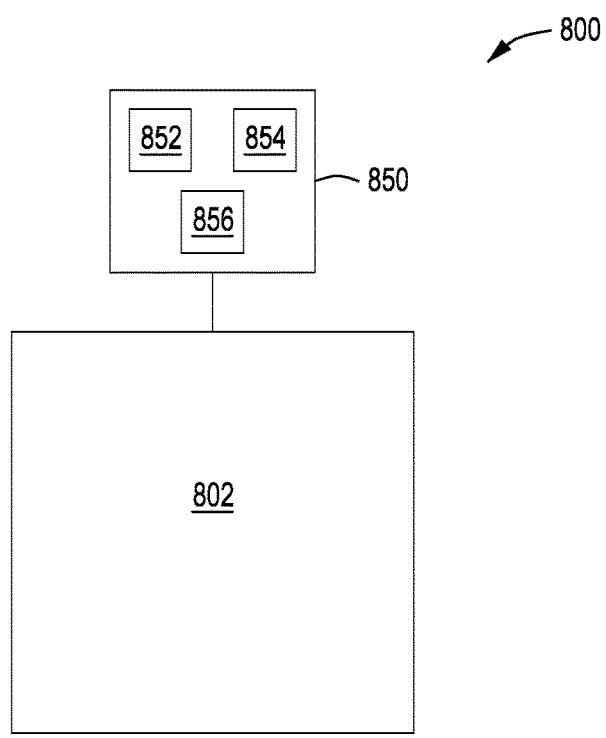
FIG. 8 is a block diagram of a system for determining corrosion in accordance with some embodiments of the present principles.

A system 800 for detecting corrosion of conductive objects is illustrated in FIG. 8. The system 800 includes a corrosion detection apparatus 802 as discussed previously (see, e.g., FIG. 3) and a system controller 850. The corrosion detection apparatus 802 may include an electrolytic bath with an anode and cathode attached to a voltage supply. The system controller 850 controls operation of the corrosion detection apparatus 802. The system controller 850 may monitor concentration levels, temperatures, and levels of the electrolytic bath and make adjustments to the corrosion detection apparatus 802 accordingly. The system controller 850 may also interact with a voltage supply connected to the anode and cathode to control a voltage level and/or a rate of voltage change based on parameters known or detected by the system controller 850.

The system controller 850 generally includes a Central Processing Unit (CPU) 852, a memory 854, and a support circuit 856. The CPU 852 may be any form of a general purpose computer processor that can be used in an industrial setting. The support circuit 856 is conventionally coupled to the CPU 852 and may comprise a cache, clock circuits, input/output subsystems, power supplies, and the like. Software routines, such as a method as described above may be stored in the memory 854 and, when executed by the CPU 852, transform the CPU 852 into a specific purpose computer (system controller 850). The software routines may also be stored and/or executed by a second controller (not shown) that is located remotely from the corrosion detection apparatus 802.

The memory 854 is in the form of computer-readable storage media that contains instructions, when executed by the CPU 852, to facilitate the operation of the semiconductor processes and equipment. The instructions in the memory 854 are in the form of a program product such as a program that implements a method of the present principles. The program code may conform to any one of a number of different programming languages. In one example, the disclosure may be implemented as a program product stored on a computer-readable storage media for use with a computer system. The program(s) of the program product define functions of the aspects (including the methods described herein). Illustrative computer-readable storage media include, but are not limited to: non-writable storage media (e.g., read-only memory devices within a computer such as CD-ROM disks readable by a CD-ROM drive, flash memory, ROM chips, or any type of solid-state non-volatile semiconductor memory) on which information is permanently stored; and writable storage media (e.g., floppy disks within a diskette drive or hard-disk drive or any type of solid-state random access semiconductor memory) on which alterable information is stored. Such computer-readable storage media, when carrying computer-readable instructions that direct the functions of the methods described herein, are aspects of the present principles.

Embodiments in accordance with the present principles may be implemented in hardware, firmware, software, or any combination thereof. Embodiments may also be implemented as instructions stored using one or more computer readable media, which may be read and executed by one or more processors. A computer readable medium may include any mechanism for storing or transmitting information in a form readable by a machine (e.g., a computing platform or a "virtual machine" running on one or more computing platforms). For example, a computer readable medium may include any suitable form of volatile or non-volatile memory. In some embodiments, the computer readable media may include a non-transitory computer readable medium.

While the foregoing is directed to embodiments of the present principles, other and further embodiments of the principles may be devised without departing from the basic scope thereof.

The invention claimed is:

1. A method of detecting corrosion of a conductive object, comprising:
   submerging a surface of the conductive object at least partially in an aqueous solution;
   flowing current through the surface of the conductive object by forming a voltage differential across the surface;
   altering the voltage differential from a first level to a second level across the surface while monitoring the current through the surface of the conductive object, wherein the second level is higher than the first level;
   applying a pulsed voltage differential during altering of the voltage differential; and
   determining a corrosion level of the surface of the conductive object based on a total charge integrated from a current-voltage cycle.

2. The method of claim 1, further comprising:
   selecting a cleaning process to remediate corrosion on the surface based on the corrosion level.

3. The method of claim 2, wherein the cleaning process remediates metal oxides from the surface.

4. The method of claim 2, wherein the cleaning process remediates metal sulfides from the surface.

5. The method of claim 2, further comprising:
   applying a protective barrier to corrosion on at least part of the surface after the cleaning process.

6. The method of claim 5, further comprising:
selecting a type of protective barrier to apply to the at least part of the surface based on the corrosion level.

7. The method of claim 1, further comprising:
adjusting a rate of increasing the voltage differential based on a concentration level of the aqueous solution.

8. The method of claim 1, wherein the surface is an internal surface of a cavity of the conductive object and a probe is inserted into the cavity using at least one non-conductive spacer to separate the probe from the internal surface of the cavity.

9. The method of claim 8, wherein the non-conductive spacer surrounds the probe and is permeable to the aqueous solution.

10. The method of claim 1, wherein the conductive object is a turbine blade.

11. A method of detecting internal corrosion of a hollow object, comprising:
connecting the hollow object as an anode to a voltage supply;
inserting a probe into a cavity of the hollow object;
connecting the probe as a cathode to the voltage supply;
at least partially submerging the hollow object in an aqueous solution such that the aqueous solution enters the cavity;
sweeping a voltage level from the voltage supply from a first level to a second level, wherein the second level is higher than the first level;
applying a pulsed voltage during sweeping of the voltage level;
measuring current flowing through the hollow object during the sweeping of the voltage level; and
determining a quantitative corrosion level of an internal surface of the hollow object based on a total charge integrated from a current-voltage cycle.

12. The method of claim 11, further comprising:
selecting a cleaning process to remediate internal surface corrosion based on the quantitative corrosion level.

13. The method of claim 12, wherein the cleaning process remediates metal oxides and metal sulfides from the internal surface.

14. The method of claim 12, further comprising:
applying a protective barrier to corrosion on at least the internal surface after the cleaning process.

15. The method of claim 14, further comprising:
selecting a type of protective barrier to apply to the at least the internal surface based on the quantitative corrosion level.

16. The method of claim 11, further comprising:
adjusting a rate of sweeping the voltage level based on a concentration level of the aqueous solution.

17. A method of detecting internal corrosion of a hollow object, comprising:
connecting the hollow object as an anode to a voltage supply;
inserting a probe into a cavity of the hollow object;
connecting the probe as a cathode to the voltage supply;
at least partially submerging the hollow object in an aqueous solution such that the aqueous solution enters the cavity;
sweeping a voltage level from the voltage supply from a first level to a second level, wherein the second level is higher than the first level;
applying a pulsed voltage with changing power polarity during sweeping of the voltage level to further reduce unwanted side reactions;
measuring current flowing through the hollow object during the sweeping of the voltage level; and
determining a quantitative corrosion level of an internal surface of the hollow object based on a total charge integrated from a current-voltage cycle.

18. The method of claim 11, wherein the probe is inserted into the cavity using at least one non-conductive spacer to separate the probe from an inner surface of the cavity.

19. A non-transitory, computer readable medium having instructions stored thereon that, when executed, cause a method for remediating corrosion on a conductive object to be performed, the method comprising:
submerging a surface of the conductive object at least partially in an aqueous solution;
flowing current through the surface of the conductive object by forming a voltage differential across the surface;
varying the voltage differential from a first level to a second level across the surface while monitoring the current through the surface of the conductive object, wherein the second level is higher than the first level;
applying a pulsed voltage differential during varying of the voltage differential;
determining a total charge corresponding to a corrosion level of the surface of the conductive object based on current versus voltage levels;
selecting a cleaning process to remediate the corrosion on the surface based on the corrosion level; and
applying a protective corrosion barrier on at least part of the surface after the cleaning process.

* * * * *